E. W. CLARK.
DEVICE FOR MOVING STALLED MOTOR VEHICLES.
APPLICATION FILED MAY 15, 1917.
1,280,401.
Patented Oct. 1, 1918.
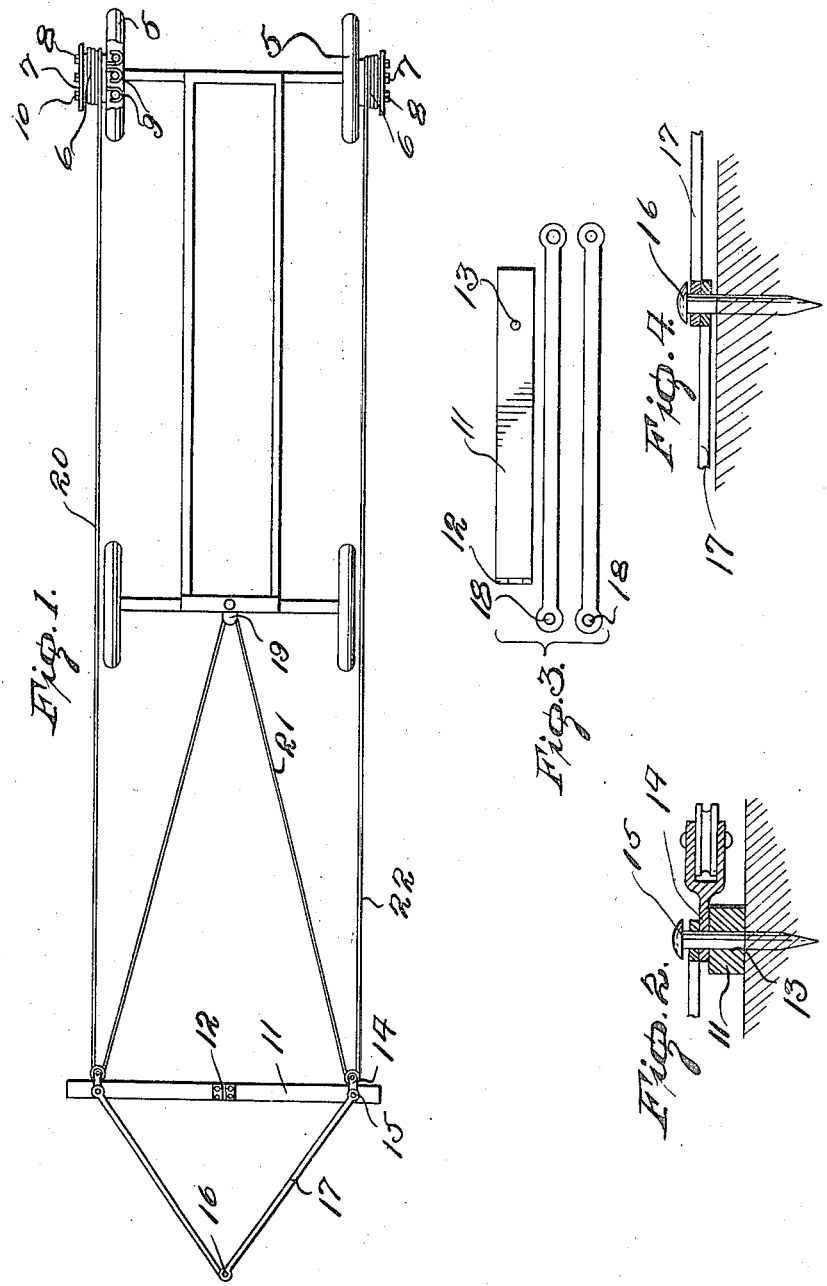

UNITED STATES PATENT OFFICE.

ELMER W. CLARK, OF LEBANON, SOUTH DAKOTA.

DEVICE FOR MOVING STALLED MOTOR-VEHICLES.

1,280,401. Specification of Letters Patent. Patented Oct. 1, 1918.

Application filed May 15, 1917. Serial No. 168,846.

*To all whom it may concern:*

Be it known that I, ELMER W. CLARK, a citizen of the United States, residing at Lebanon, in the county of Potter, State of South Dakota, have invented certain new and useful Improvements in Devices for Moving Stalled Motor-Vehicles; and I do hereby declare the following to be a full, clear, and exact description of the invention, such as will enable others skilled in the art to which it appertains to make and use the same.

This invention relates to new and useful improvements in devices for moving stalled motor vehicles and the like, and has for its primary object to provide a device of this character which will greatly facilitate the aforementioned operation.

A further object of the invention is to provide a device of this character which is capable of being folded to occupy but little space in order that the same may be carried as a part of the tool equipment of a motor vehicle.

Referring to the drawings,

Figure 1, is a top plan view of an automobile chassis showing the method of using the device, Fig. 2, is a detail view showing the method of securing the anchor to the ground, Fig. 3, is a detail view of a portion of the anchor; and, Fig. 4, is a detail view of another portion of the anchor.

Referring more particularly to the drawings, the reference character 5 designates the rear wheels of a motor vehicle, and adapted to be secured to each of said rear wheels is a drum 6 the outer face of which is provided with a flange 7. One of these drums 6 is adapted to be secured to each of the wheels 5 concentrically thereof, and passing through said drums are bolts 8 which are provided with hooked ends 9 to receive the spokes of the wheels. The opposite end of each bolt 8 is screw threaded and engaging said screw threaded end is a nut or the like 10. By tightening up the nut 10 it will be seen that the drum 6 is engaged with the outer face of the spokes, the hooked ends 9 of the bolts passing around said spokes to secure the drum in place.

The anchor comprises a metallic member 11 which is provided intermediate of its ends with a hinge 12, the said member 11 being provided at a point near each of its ends with a perforation 13. The said member 11 is further provided near each of its ends with a pulley or the like 14, which is provided with an eye or link for securing it to the member 11.

In use, the member 11 is adapted to be secured to the ground by means of stakes or the like 15 which pass through the openings 13, and the pulleys 14 are secured to the member 11 by means of said stakes 15 which pass through the eye or link carried by the pulley. When the member 11 has been secured to the ground by the stakes 15, a stake 16 is driven in advance of the number 11 but in a line with the center thereof, and connecting said stake 16 with each of the stakes 15 is a flexible member 17 each end of which is provided with a ring 18 in which the stakes are engaged.

A pulley 19 is suitably secured to the front axle of the motor vehicle, and having one of its ends secured to one of the drums 6 and extending forwardly of the machine is a flexible rope or cable 20 which passes through one of the pulleys 14, thence back to and around the pulley 19 carried by the front axle of the machine thence forward again as at 21 to the other pulley 14 and thence rearwardly as at 22 to the other drum 6 where the end is suitably secured.

After the parts have been positioned as above described it will be seen that as the rear wheels 5 of the motor vehicle are driven, the rope or cable 20 will be wound upon the drums 6 thus moving the motor vehicle along the road.

From the foregoing it will be seen that the present invention provides a novel device of this character which is capable of transportation as part of the tool equipment of a motor vehicle, and which is at the same time very efficient for the purpose intended.

Having thus described the invention, what is claimed, is:

In a device of the character described, the combination with a pair of winding drums adapted to be detachably secured to the rear wheels of an automobile, of an anchoring bar having perforations near its ends, anchoring pins removably passed through the perforations and adapted for engagement in the ground, pulleys connected to the bar near the ends thereof, a pulley adapted to be connected to the front axle of the automobile medially thereof, a flexible member trained through the pulleys and having its ends connected with the drums and adapted to be wound thereon, links detachably connected with the anchoring pins and anchor means common to the links and adapted to be engaged therein and anchored in the ground.

In testimony whereof, I affix my signature, in the presence of two witnesses.

ELMER W. CLARK.

Witnesses:
R. A. JACKSON,
TIMOTHY GEIST.

Copies of this patent may be obtained for five cents each, by addressing the "Commissioner of Patents, Washington, D. C."